US012731347B2

(12) United States Patent
Chen et al.

(10) Patent No.: US 12,731,347 B2
(45) Date of Patent: Sep. 8, 2026

(54) METHODS TO IMPROVE PASSTHROUGH EXPERIENCE IN LOW LIGHT CONDITIONS

(71) Applicant: Adeia Guides Inc., San Jose, CA (US)

(72) Inventors: Tao Chen, Palo Alto, CA (US); Ning Xu, Irvine, CA (US)

(73) Assignee: ADEIA GUIDES INC., San Jose, CA (US)

( * ) Notice: Subject to any disclaimer, the term of this patent is extended or adjusted under 35 U.S.C. 154(b) by 245 days.

(21) Appl. No.: 18/620,059

(22) Filed: Mar. 28, 2024

(65) Prior Publication Data

US 2025/0308170 A1 Oct. 2, 2025

(51) Int. Cl.

| | |
|---|---|
| ***G06T 19/00*** | (2011.01) |
| ***G02B 27/01*** | (2006.01) |
| ***G06F 3/01*** | (2006.01) |
| ***G06V 10/141*** | (2022.01) |
| ***G06V 10/60*** | (2022.01) |

(52) U.S. Cl.

CPC ........ *G06T 19/006* (2013.01); *G02B 27/0172* (2013.01); *G06F 3/011* (2013.01); *G06V 10/141* (2022.01); *G06V 10/60* (2022.01)

(58) Field of Classification Search

None

See application file for complete search history.

(56) References Cited

U.S. PATENT DOCUMENTS 7,158,099 B1 * 1/2007 Berube .................. G06V 40/16 345/9
9,927,087 B1 * 3/2018 Greene ................. F21S 43/255
2014/0368496 A1 * 12/2014 Strassenburg-Kleciak .................. G06T 15/04 345/419
2015/0192259 A1 * 7/2015 Patel ..................... F21V 21/084 362/231

(Continued)

FOREIGN PATENT DOCUMENTS

EP 3264246 A1 * 1/2018 ............. G06T 19/20
EP 3712600 B1 * 10/2022 ......... G01N 21/8914

(Continued)

OTHER PUBLICATIONS

How to use Passthrough on Meta Quest (https://www.meta.com/help/quest/617966963105359/) (downloaded Feb. 9, 2026) (4 pages).

(Continued)

*Primary Examiner* — Jwalant Amin
(74) *Attorney, Agent, or Firm* — HG LAW LLP

(57) ABSTRACT

A physical object seen in a display of an XR device, such as an HMD in passthrough mode, in a virtual environment may be illuminated so that the physical object is adequately rendered by a display of the XR device. A lighting condition may be detected. A position of the physical object relative to the XR device may be determined, and an angle for directing a light cone to illuminate a portion of the physical object based on the determined position of the physical object may be determined. The angle of a light cone may be adjusted to (Continued)

1000

1002 detect a light condition

1004 Determine that the light condition fails to meet a threshold light condition?

no yes 1006 determine a position of the physical object 1008 determine a distance to the physical object 1010 determine a first angle of a first light cone to illuminate the physical object 1012 control the light source to emit the first light cone 1014 capture a first image of the physical object 1016 render the first image of the physical object 1018 continue to track the physical object and illuminate it 1020 determine a new position of the physical object and determine new angle based on position and distance 1022 control the light source to emit the second light cone 1024 capture and render second image of the physical object illuminate the physical object as it moves and reorients in space may entail positioning a micro-electro-mechanical system (MEMS) mirror as part of the light source so as to reflect the light cone onto the portion of the physical object in a line of sight of the light source.

20 Claims, 12 Drawing Sheets

(56) References Cited

U.S. PATENT DOCUMENTS

| | | | | |
|---|---|---|---|---|
| 2016/0335917 | A1* | 11/2016 | Lydecker | G06F 3/167 |
| 2017/0026557 | A1* | 1/2017 | Watanabe | H04N 23/651 |
| 2019/0392240 | A1* | 12/2019 | Araújo | G06F 3/0304 |
| 2020/0174104 | A1* | 6/2020 | Kim | G01S 7/4815 |
| 2020/0192553 | A1* | 6/2020 | Van De Sluis | G06F 3/04842 |
| 2024/0061510 | A1* | 2/2024 | Fainstain | A61B 5/6814 |
| 2025/0103264 | A1* | 3/2025 | Salter | G06F 3/14 |
| 2025/0218134 | A1* | 7/2025 | Bryan | G06T 19/006 |
| 2025/0227219 | A1* | 7/2025 | Yu | H04N 13/361 |

FOREIGN PATENT DOCUMENTS

| | | | | |
|---|---|---|---|---|
| WO | WO-2020043856 A1 * | 3/2020 | | G01M 11/064 |
| WO | WO-2023143594 A1 * | 8/2023 | | G01S 7/4817 |

OTHER PUBLICATIONS

"MEMS Scanning Mirror," Precisely Microtechnology Corp., A Hankook Company (undated) (https://preciseley.com/product/mems-scanning-mirror/).

Ferrell, "Why Everyone is Wrong about the Apple Vision Pro (including me)," Undecided, Exploring how technology impacts our lives (2024) (18 pages) (https://undecidedmf.com/why-everyone-is-wrong-about-the-apple-vision-pro/).

Wan et al., "Purifying low-light images via near-infrared enlightened image," IEEE Transactions on Multimedia, 25:8006-8029 (2023).

Wu et al., "How to Train Neural Networks for Flare Removal," Proceedings of the IEEE Xplore, 2239-2247 (2021).

Zhu et al., "Efficient Model-Driven Network for Shadow Removal," Proceedings of the AAAI Conference on Artificial Intelligence, 36(3):3635-3643 (2022).

* cited by examiner

105

101
110
112
124-R
124-L
102
106
108

101
401b
401a

1000

METHODS TO IMPROVE PASSTHROUGH EXPERIENCE IN LOW LIGHT CONDITIONS

BACKGROUND

The present disclosure relates to extended reality (XR) equipment, for example, rendering provided by augmented reality (AR) displays and, in particular, relates to improved illumination of the physical objects that are displayed.

SUMMARY

Extended reality (XR) equipment, such as a head mounted displays (HMDs), smart glasses, and the like, provide mixed reality (MR), virtual reality (VR), and/or augmented reality (AR) experiences. In some instances, a user of XR equipment may wish to view physical objects in her environment. This may be facilitated using optical see-through (OST) functionality or video see-through (VST) functionality (sometimes, VST is referred to as "passthrough"). When OST is implemented, optical light passes through a lens as it does through a pair of traditional eyeglasses, enabling a user to observe his or her environment through the lens of a headset. When VST or passthrough is implemented, one or more cameras of XR equipment detect or capture physical objects in the vicinity of the XR equipment and displays inside the XR equipment render the physical objects in a virtual environment. In some instances, an entire display of the XR equipment displays a scene captured by one or more cameras of the XR equipment, enabling the user to see her environment (almost as if she is looking through glass). In some instances, the XR equipment displays a MR scene comprising at least part of the user's physical environment that has been "passed through" the XR equipment, supplemented or augmented by virtual objects rendered by the XR equipment. In some instances, a display of the XR equipment displays a MR scene, wherein the XR equipment displays a virtual or digital scene while selectively "passing through" one or more physical objects from the user's environment (e.g., her hands). This allows the user to perceive "passed through" real-world objects as if they exist in the rendered virtual scene. When implementing VST or passthrough, the XR equipment may be referred to as, e.g., operating in a VST or passthrough mode. For example, in a passthrough mode, if two people wearing XR equipment are playing chess on a virtual chessboard, each user may see his arm(s) and the arm(s) of his opponent as virtual chess pieces are lifted and moved on a virtual chessboard, e.g., in an AR environment. Passthrough mode is vital for many interactive experiences, as well as safety in some circumstances because users may not be able to see with precision where physical objects, including their own limbs or other nearby physical objects, are located or begin and end, potentially causing accidents.

A technological problem that may arise in such situations in less-than-ideal lighting conditions is that the cameras of the XR equipment may not capture sufficient light reflecting from a physical object and thus the XR equipment's display may poorly render the physical object. For instance, a user's hand or arm in a dark room may not be easily captured using the cameras on the XR equipment. Consequently, the XR equipment may have difficulty discerning the edges of the physical object and determining the position of the physical object, resulting in the XR equipment inconsistently rendering the physical object from frame to frame. For example, a user's arm may partially blend into the virtual object near it and thus the user may have difficulty interacting with virtual objects. Such issues may be exacerbated when the physical object is in motion, due to a shorter exposure time that increases the difficulty of object detection, identification, and tracking. For example, a captured object in motion may appear to have, e.g., a fuzzy light-colored border around a user's hand. In addition, cameras may apply automatic gain to compensate for the lack of light, which may increase noise, seen in the output image as graininess or as visual artifacts.

Some approaches to illuminating a scene for photography or videography, including with the use of flashes, Fresnel lanterns, and reflectors, may work in some circumstance; however, such illumination typically requires using a lot of light, battery power, and resources because, e.g., an entire scene may be illuminated. Also, techniques for compensating for excessive lighting of large portions of the scene may be needed. Increased lighting may also add extra weight to XR devices in addition to tapping valuable energy resources. In addition, more natural ambient lighting conditions without excessive artificial lighting is generally preferable. Moreover, lighting a large area may disrupt nonusers around the XR device and/or discourage use of the XR device. Infrared, (laser) light detection and ranging (LIDAR), or other such techniques may be used to track physical objects. However, such techniques may not suffice in capturing and rendering a high quality, color image of a physical object (e.g., because infrared exists outside the visible spectrum of light)

A technological solution provided according to an aspect of the disclosure relates to providing sufficient light for object detection, object tracking, and object rendering without providing excessive light or light compensation (which may interfere with rendering quality) and while avoiding wasteful energy expenditure. This may be accomplished by utilizing a minimal effective intensity of light, minimizing the space illuminated while maintaining effectiveness (e.g., from frame to frame), or some combination thereof. For example, some embodiments may involve, e.g., determining a distance of the physical object to the XR equipment and directing light to the physical object, or a portion thereof, for which insufficient lighting is detected. In an embodiment, a low light condition may be detected for a scene or physical area as a whole, not necessarily for a particular physical object. For example, the system may determine whether an ambient light level of the physical space meets a threshold light level. The system may then calculate a difference between the current low light condition and a target illumination level, and then the position of one or more target physical object(s) may be determined so that the physical object(s) may be illuminated by a light source, for example, an HMD-mounted light source. The light source may illuminate only portions of the physical object in the line of sight of the light source. The system may track the physical objects, for example, using LiDAR or other means, as they move and change orientation in relation to the light source. In an embodiment, the target illumination level may vary depending on the type of physical object. A physical object that is shinier or lighter in color may require less illumination than other physical object. In an embodiment, the system may adjust the light source to provide the adequate amount of illumination of the type of physical object but not more than the amount of light needed.

In an implementation, an amount of illumination necessary to obtain quality rendering of a physical object, for example, 5 lumens, may be output by the light source regardless of the current ambient light condition. A light cone angle may be determined, e.g., depending on the size of the physical object and its distance from the light source, and the physical object may be illuminated and/or scanned by the light cone. In some embodiments, a virtual plane normal to the light cone may be determined such that the physical object lies on a region of the virtual plane, and the light cone may be sized based on the distance from the virtual plane, a size of the physical object (or a size of a portion of the physical object within line of sight of the light source), or an illumination path or route determined by the system for illuminating the physical object or portions thereof between the beginning and end of the image capture. It may be understood that the term light cone does not necessarily mean a perfect cone-shaped light emitted from a light source. For example, the light source may not be round, or an aperture through which light is emitted may not be round, so that light emitted therefrom may not conform to a cone shape but, for example, may be a pyramid (initially at the point of emission). In some embodiments, there may be a plurality of light sources, such as LEDs, where each may be angled so that a combination of LEDs may be selected to illuminate a certain angle and/or distance.

In some embodiments, a minimum size of the light cone may be selected to provide illumination of the physical object. For example, LiDAR may be used to scan the physical space 109 to find a physical object 105, and to determine the size and shape of the portion of the physical object 105 within the line of sight of the LiDAR coupled to the HMD. In an embodiment, the light source includes one or more micro-electro-mechanical system (MEMS) mirrors that it may be used to control a light cone on the physical object. The size of the light cone may be selected to correspond to the size of the physical object, or to one dimension of the physical object. For example, a physical object may have a length of 18 cm and a width of 4 cm. The physical object may be illuminated along its length such that a path of the light cone starts from one end of a virtual line segment extending along the length of the physical object. In this case, the light cone may be sized to illuminate an entire width of the physical object—a segment of the light cone incident on the physical object may have a radius of 2 cm—so that a single pass of the light cone along the length of the physical object illuminates the entire physical object. In an embodiment, a illumination path of the light cone may be selected to minimize the amount of light needed at a given time to illuminate the physical object for an image capture. The size of the light cone may change in response to movement of the physical object with respect to the light source. According to an aspect of the disclosure, the illumination is selected to be sufficient for capture of an image of the physical object by a camera to provide an accurate rendering of the physical object by the system, and the illumination of the physical object may not be calibrated to achieve optimal direct human vision of the physical object.

In some embodiments, the XR equipment tracks the physical object over time and controls the light source to track the physical object, thereby maintaining illumination of the physical object (or at least part of the physical object) regardless of whether the physical object moves relative to the XR equipment. In an embodiment, the XR equipment utilizes a MEMS mirror to track a fast-moving physical object by manipulating the MEMS mirror orientation to quickly change a projection angle of the light source. For example, one or more cameras of the XR equipment may capture video at 240 frames per second (fps). The XR equipment may control the light source to emit a light cone according to a first angle needed to illuminate the object. The XR equipment may capture a first frame. The object may move, and the XR equipment may adjust the light source to emit the light cone according to a second angle needed to maintain illumination of the object. Then, the XR equipment may capture a second frame (e.g., 1/240 of a second after capturing the first frame) with the object still illuminated.

In some embodiments, the XR equipment manipulates the light source to change angles even when the physical object does not move relative to the camera or the light source. This may be useful when the XR equipment utilizes a light cone smaller (perhaps much smaller) than the physical object. For example, the XR equipment may utilize an illumination path to illuminate, over a time period, a number of regions that, in whole, cover the physical object or a desired portion of the physical object (despite the light cone not covering the physical object at any given instant in time).

The time period may correspond to the exposure time of the camera(s) used to capture the image. For example, the XR equipment may illuminate a first region covering a first part of the illumination path (encompassing a first part of the object). The illumination path may be chosen (e.g., by the XR equipment) along with a given size of a light cone, to cover the entire physical object (or the desired portion of the physical object, for example, the portion of the physical object in the line of sight of the camera) by moving the light cone along the illumination path during the time period. The XR equipment may begin capturing an image of the object. Then, the XR equipment may adjust the light source to illuminate a second part of the illumination path encompassing a second part of the object. The XR equipment may continue adjusting the light source to capture additional parts of the illumination path until the entire illumination path has been illuminated at some point during the time period. After the light source illuminates the final part of the illumination path encompassing the last part of the object (or desired portion) that has not yet been illuminated, the XR equipment may finish capturing the image. Any suitable exposure, including a combination of the settings in ISO, aperture and shutter speed, may be utilized for the image capture, such as an ISO of 200, an aperture of f/8 and a shutter speed of 1/200 second. After finishing the image capture, the XR equipment may render, for display, the captured image of the physical object or desired portion. Due, at least in part, to the ability to quickly adjust the light source and to illuminate the illumination path over a short period of time during the image capture, the physical object or desired portion may appear in the image to be illuminated by a light covering the entire physical object or desired portion (despite using a smaller light cone).

In some embodiments, a relationship exists between the determined illumination path and the determined size of the light cone. For example, a desired light cone size may be determined. Given the light cone size, the XR equipment may determine an optimal illumination path to cover the physical object during the time period. In some instances, a desired illumination path may be determined (e.g., at least roughly determined). For example, the XR equipment may determine an illumination path that involves three horizontal illuminations separated by a desired physical distance. Given the desired illumination path, the XR equipment may determine an optimal light cone size.

According to an embodiment, the illumination provided in this way may be substantially less than that provided by conventional methods. Said another way, the provided illumination may be considered more precise than other approaches, resulting in a higher percentage of the light emitted hitting desired objects and a lower percentage of "wasted" light. For this reason, an amount of power required for providing sufficient illumination may be minimized compared to other approaches, and thus battery life of the XR device may be enhanced. Such illumination may be less distracting to humans and may be less intrusive to a scene or area as a whole. At the same time, more accurate rendering of physical objects by XR equipment may be obtained using such adaptive and dynamic lighting techniques.

A method, system, non-transitory computer-readable medium, and means for implementing the method are disclosed for controlling a light source to illuminate a physical object, for example, a physical object seen in a display of an HMD in a virtual environment. Such a method may include: detecting, via a sensor of an XR device, a first position of a physical object relative to the XR device, wherein the physical object is experiencing a lighting condition; determining a first angle for directing a first light cone to illuminate, by a light source, a portion of the physical object—the first angle may be determined according to the first position of the physical object relative to the XR device; emitting from the light source the first light cone at the determined first angle; capturing, by a camera of the XR device, a first image of the portion of the physical object illuminated by the first light cone; detecting, via the sensor of the XR device, a second position of the physical object relative to the XR device; determining a second angle for directing a second light cone to illuminate, by the light source, the portion of the physical object, wherein the second angle is determined according to the second position of the physical object relative to the XR device; emitting from the light source the second light cone at the determined second angle; capturing, by the camera of the XR device, a second image of the portion of the physical object illuminated by the second light cone; and rendering, for display on the XR device using a passthrough mode, the first image of the portion of the physical object and the second image of the portion of the physical object.

The method may entail continuing to track the physical object. The captured image may be segmented—image data of the portion of the physical object may be segmented so that the rendering of the first image of the portion of physical object includes displaying the first image and the second image over a virtual background displayed by the display of the XR device. The segmenting may be used by the system, for example, a machine vision system, to identify a location of the physical object in 3D space so that the light source may be appropriately controlled to direct light onto the physical object. Once the size of the physical object and the distance to the physical object are determined, an angle for directing the light cone light source may be determined. Adjusting the angle may involve positioning a micro-electro-mechanical system (MEMS) mirror so as to reflect the light cone onto a portion of the physical object in a line of sight of the light source. The light cone may be emitted using the MEMS mirror. A first dimension of the physical object may be determined, and the size of the light cone may be set based on the first dimension and size of the first light cone may be selected to illuminate in one instant an entirety of the first dimension.

The XR device may be a head-mounted display (HMD) and the light source includes an LED mounted on, or to, the HMD.

A radius of the first light cone may be equal to the radius of the second light cone. A minimum size of the light cone that is still sufficient to illuminate an entirety of a dimension of the physical object may be determined. This portion of the physical object may be the portion that is within the line of sight of the light source. Then the light cone may be sized according to the minimum size. A dimension of the portion of the physical object in the line of sight of the light source may be determined. Then a illumination route of the light cone may be determined over the portion of the physical object based on the dimension of the physical object—the illumination route may be determined by minimizing a cost function in which energy spent for the illuminating of the light cone is a term of the cost function. A longest dimension of a portion of the physical object in a line of sight of the light source may be identified. A illumination route of the light cone over the physical object may be set such that the light cone starts the illumination route at one end of a virtual line segment connecting distal points of the longest dimension, such that the light cone is sized to encompass a widest portion of the physical object within the line of sight of the light source perpendicular to the longest dimension.

Detecting of the lighting condition for the physical object may be performed by the XR device after image data of the physical object are captured by a camera of the XR device.

The determining of the distance of the physical object relative to an XR device may be based on data obtained by a depth sensor mounted on the XR device, or may be obtained using LiDAR scanning.

In some embodiments, the entire portion of the physical object in a line of sight of the light source is illuminated at one instant by the light source. The first image of the entire portion of the physical object in the line of sight of the light source as illuminated by the light source may be captured in a single frame of video by the camera.

The system may select an illumination path to be traversed by the first light cone over the first portion of the physical object; the first light cone may be emitted at the determined first angle to illuminate a first area of the first portion of the physical object. Then the process may entail: controlling, according to the selected illumination path, the light source to emit the first light cone at a second angle—this second angle may be distinct from the first angle and at the second angle the first light cone illuminates a second area of the first portion of the physical object; and capturing in a single video frame an entirety of the first portion of the physical object, including the first area and the second area, as illuminated by a traversal by first light cone of the illumination path.

An image of the entire portion of the physical object in the line of sight of the light source as illuminated by the light source may be captured in a single frame of video by the camera. For example, the entire portion of the physical object in the line of sight of the light source may be illuminated by the light source by directing the light cone along a illumination route to successive points on the portion of the physical object in the line of sight of the light source.

The determining of the angle for directing the light cone may include any one or more of: determining a virtual plane perpendicular to a virtual line extending from the light source; determining a minimum size of a section of a cone sufficient to encompass an entire dimension of a portion of the physical object lying on the virtual plane; and generating the light cone with the minimum size and directed to illuminate the entire dimension of the portion of the physical object lying on the virtual plane. The determining of the first position of the physical object relative to the XR device may be calculated using data obtained by a depth sensor mounted on the XR device. The entire portion of the physical object in a line of sight of the light source may be illuminated at one instant by the light source, and the first image of the entire portion of the physical object in the line of sight of the light source as illuminated by the light source is captured in a single frame of video by the camera.

Such a process may include any one or more of: selecting an illumination path by the first light cone over the first portion of the physical object; emitting the first light cone at the determined first angle to illuminate a first area of the first portion of the physical object; controlling, according to the selected illumination path, the light source to emit the first light cone at a second angle, wherein the second angle is distinct from the first angle and at the second angle the first light cone illuminates a second area of the first portion of the physical object; capturing in a single video frame an entirety of the first portion of the physical object, including the first area and the second area, as illuminated by a traversal by the first light cone of the illumination path.

The determining of the angle for directing the light cone may include: determining a virtual plane perpendicular to a virtual line extending from the light source; determining a minimum size of a section of a cone sufficient to encompass an entire dimension of a portion of the physical object lying on the virtual plane; and generating the light cone with the minimum size and directed to illuminate the entire dimension of the portion of the physical object lying on the virtual plane.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 11A-11C illustrate examples of illumination patterns of the physical object, according to an aspect of the disclosure.

DETAILED DESCRIPTION

Figure 1:
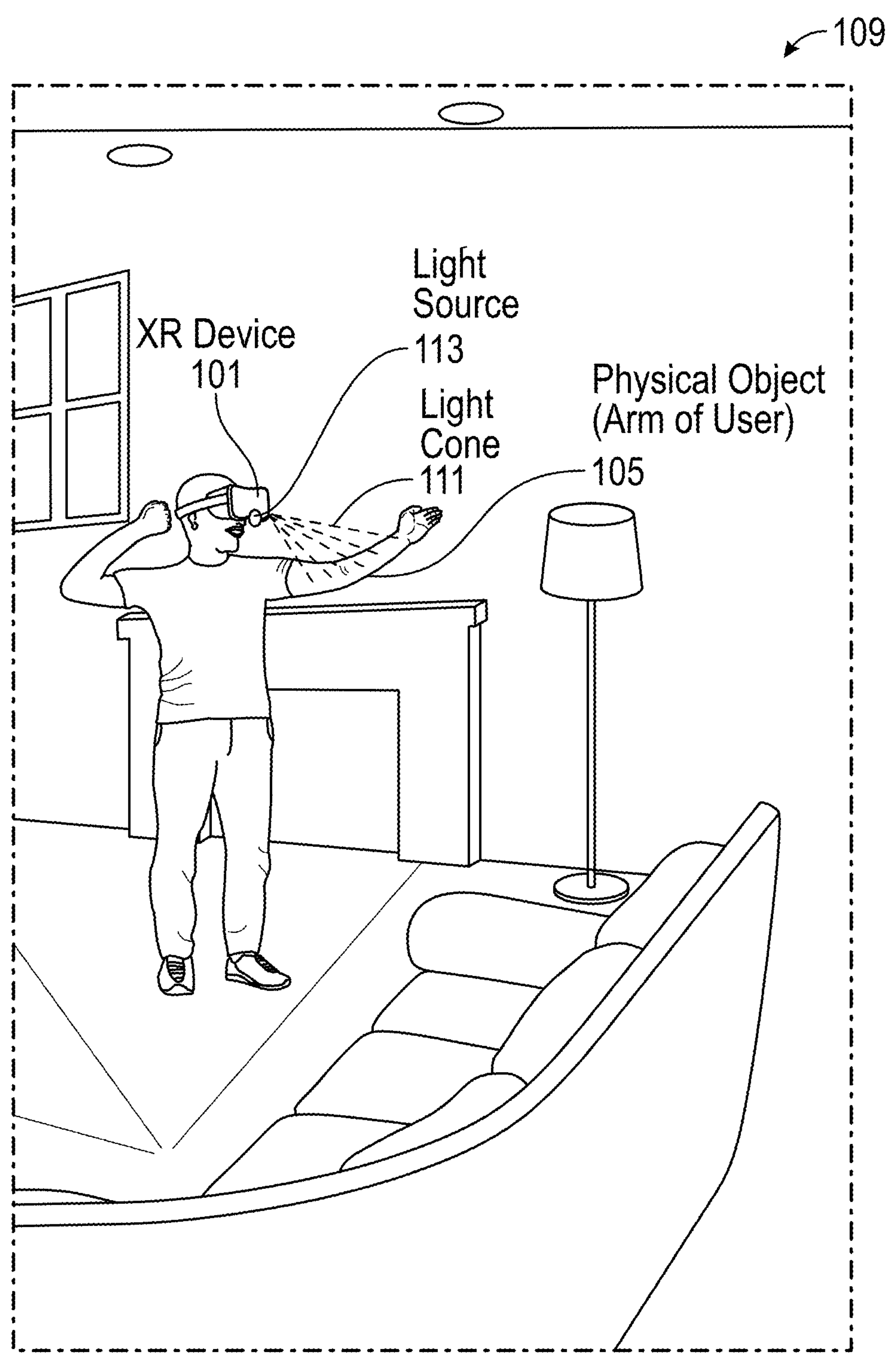
FIG. 1 illustrates an example of an XR device illuminating a physical object, shown as a wearer's arm, in response to detection of a lighting condition insufficient for adequately rendering the physical object on a display of the XR device, according to an aspect of the disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

References herein to an "XR device" refer to a device providing virtual reality (VR), mixed or merged reality (MR), or augmented reality (AR) functionality (e.g., wherein virtual objects or graphic overlays are provided in addition to real-world objects or environments visible via the device). The terms AR and MR may sometimes be used interchangeable with XR herein. An XR device may take the form of glasses or a headset in some instances (e.g., a head-mounted display or HMD). While some references are made to a VR device or devices, appreciate that some or all of the described techniques may be implemented with respect to any suitable XR device (e.g., an XR device that provides an MR or AR scene that is partially or wholly populated by virtual objects). For example, some or all of a real-world environment may be visible via XR devices of multiple users, and the users may generate reconfigured safe areas and a virtual partition for their XR devices utilizing the techniques discussed herein. In some embodiments, the described XR or VR devices may include see-through capabilities enabling the display of some or all of a user's real-world environment. For example, the XR device 101 may include optical see-through (OST) capability in which light passes through the display, providing "through the glass" visibility of an environment. In an embodiment, the XR device 111 may include video see-through (VST) capability, wherein cameras (e.g., mounted on or within the device 111) capture images or video of the user's environment and render a corresponding video, allowing the user to view, in whole or in part, his or her real-world environment by way of the video.

FIG. 1 illustrates a user wearing XR device 101, shown in this example as a head-mounted display (HMD). The XR device 101 may track and capture images of the a physical object 105. As depicted, the physical object is a user's hand or arm 105 in an embodiment. In some embodiments, the physical object 105 is an object held by the user's hand. In some embodiments, the physical object 105 may be some other object in the user's environment (e.g., which the user has selected to be tracked and captured). In any event, the physical object 105 may be dimly lit under the ambient lighting conditions in the physical space 109. The system may determine an ambient lighting condition in the physical space 109 and compare it to a threshold lighting condition necessary or advantageous for proper camera capture and rendering. The system may determine a position of the physical object 105 via infrared or LiDAR and determine whether luminance in the general area of the physical object 105 meets the threshold. According to an aspect of the disclosure, the poor lighting may be sufficient for human eyes under normal circumstances but the cameras of the XR device 101 may be capturing insufficient light from physical object 105 to be rendered clearly on the internal displays of the XR device 101. For this reason, in response to the detection of poor lighting conditions for the physical equipment physical object 105, for example in a passthrough mode, the XR device 101 may control one or more of its light sources 113, such as LEDs of the XR device 101, to emit a light cone 111 to illuminate physical object 105, or a portion thereof, as needed to render physical object 105 more clearly on the internal displays of the XR device 101. In some embodiments, the light source 113 may include a light emitter, such as an LED, a lens for focusing the light beam emitted, a reflector element (such as a MEMS mirror), or any combination thereof.

According to an embodiment, an image of a physical object captured by one or more external cameras of the HMD may be segmented and may undergo additional image processing One or more light sources 113 may be installed as part of the XR device 101 or may be connected thereto. The light source 113 may be automatically or manually adjustable—the direction/angle of the emitted light, brightness level, color temperatures, and the like, or a combination of such factors, may be controlled depending on a range of factors, including one or more of the ambient lighting, the distance to physical object 105, the size of physical object 105, the size of the exposed/near side of physical object 105, the darkness/color/light absorption properties of physical object 105, the accuracy required for and the mood of the XR activity being conducted, the speed of movement of physical object 105, the speed of movement of the XR device 101, the illumination of physical object 105 provided by another XR device **101*b* (shown in FIG. 12**), and other such factors.

In an embodiment, the illumination provided by the light source 113 need not be always at the brightest setting. For each device or model, appropriate settings of lighting may be determined based on the actual environment, including one or more of the factors listed above. For example, illumination may be 3-50 lumens, or may be in the 4-7 lumen range. For example, the light source may provide 5 lumens.

The amount of light provided by the light source may be calibrated automatically in advance for the ambient lighting of the physical space. The lighting level may be optimized through calibration.

In an embodiment, infrared, LiDAR sensors or other such sensors may be used to track the physical object as it moves in relation to the HMD camera. For example, 3D LiDAR scanning may be used to determine and/or track a physical object. The position of the physical object may be obtained through the depth sensor or other methods. The shape and size of the light cone 111 may then be set to illuminate the physical object.

In a generally dark scene, such guidance may facilitate illumination only one or more physical objects for which additional illumination is needed, but not light up the entire scene, which may be disruptive to the XR activity. In this way, the extent of illumination provided to the scene may be optimized to minimize the introduction of lighting to others in a proximity.

In an embodiment, compensation may be applied if it is determined that lighting is to be removed in the captured video or in the rendering of captured video. The physical device 105, or a portion thereof, may receive excess light from the light source 113, or other nearby objects may be illuminated with excess light from the light source 114. In addition to the consistency in rendering the positions and depth of physical object 105, the system may ensure that over time, as physical object 105 moves in relation to the light source 113, which itself may move as the user tilts or rotates his/her head or otherwise moves, a consistent appearance of physical object 105 is rendered—brightness, colors, etc. The system may reduce temporal variation due to the changes of added lighting that are caused by the detected motion of physical object 105 in relation to the light source 113 and in relation to other light sources in the physical space, including a light source **113*b* provided by another XR device (shown in FIG. 12). To minimize the impact to the appearance in rendering, compensation may be applied to remove undesirable effects due to added lighting, after the detection of depth, tracking of position of physical object 105**, etc. Such methods may remove flare, shadow and the like.

Figure 2B:
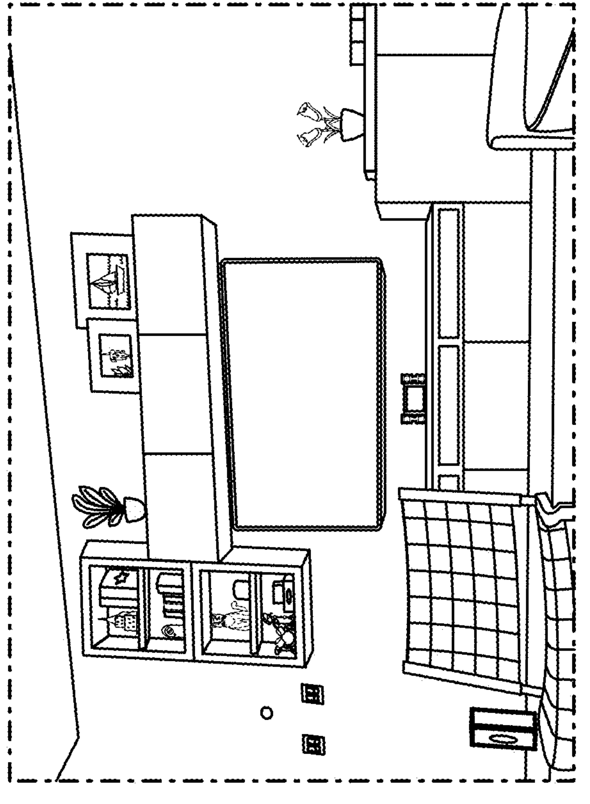
FIG. 2B illustrates an example of the scene full of physical objects captured in a digital photo.
Figure 2A:
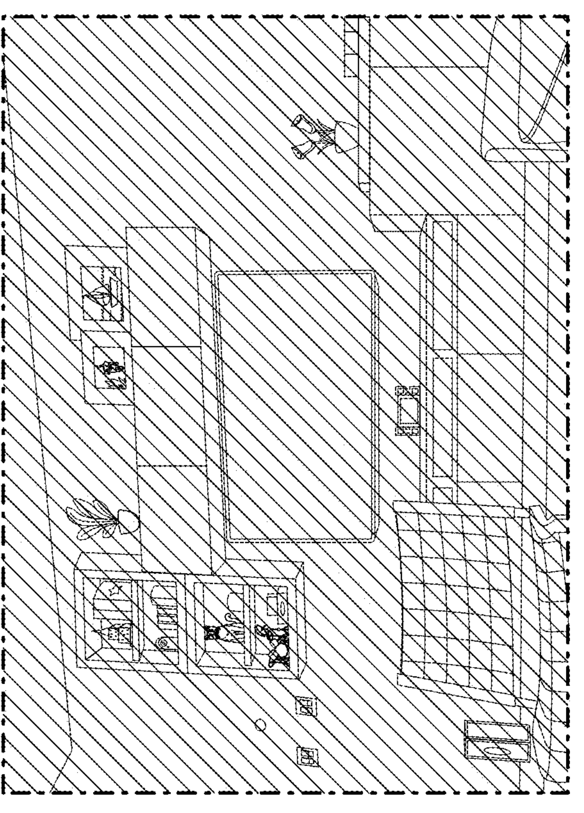
FIG. 2A illustrates an example of a scene full of physical objects rendered in a passthrough mode of an XR device.

FIGS. 2A and 2B show a comparison of a recording of a scene in a passthrough mode (FIG. 2A) with a photo of the same scene taken by a smartphone (FIG. 2B). The perceived video quality of live experience in the passthrough mode may often be inferior to the recording of video in the passthrough mode. HMD cameras often capture insufficient light for the displays of the HMD to render sharp images of physical objects.

Figure 3B:
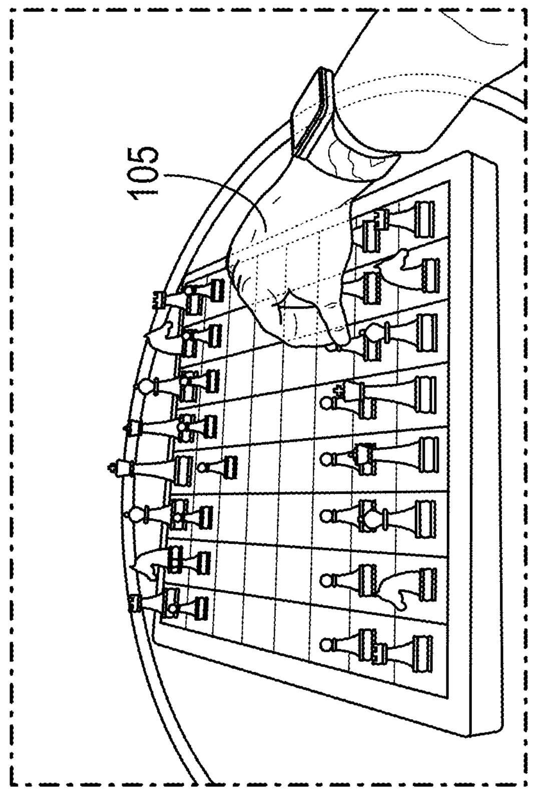
FIGS. 3A-3F illustrate frames from a passthrough video captured in a low-light environment.
Figure 3A:
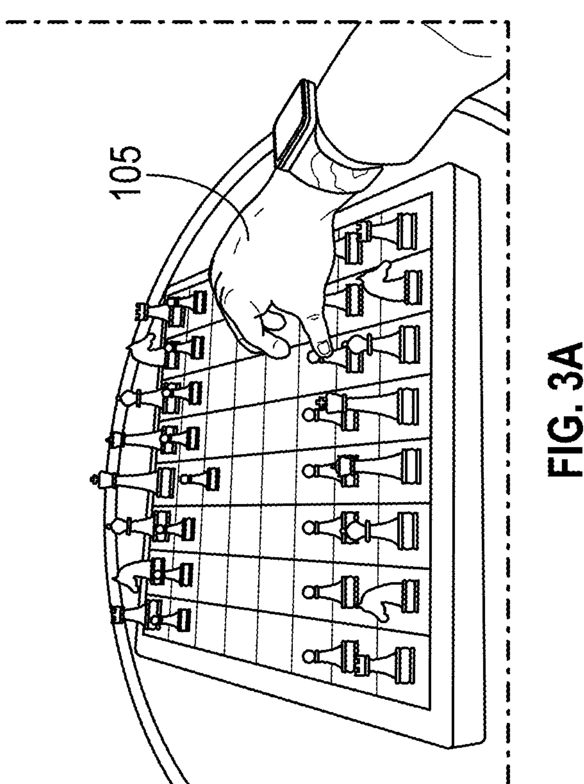
Figure 3D:
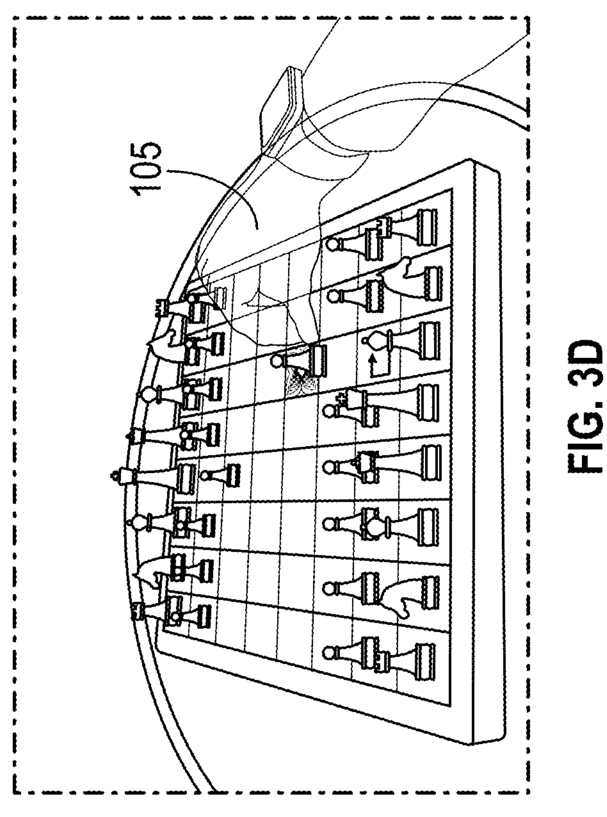
Figure 3C:
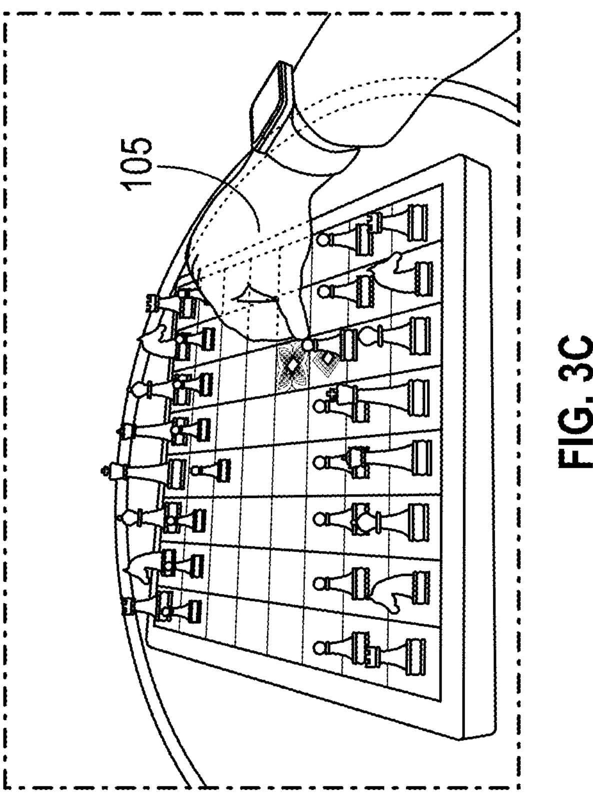
Figure 3F:
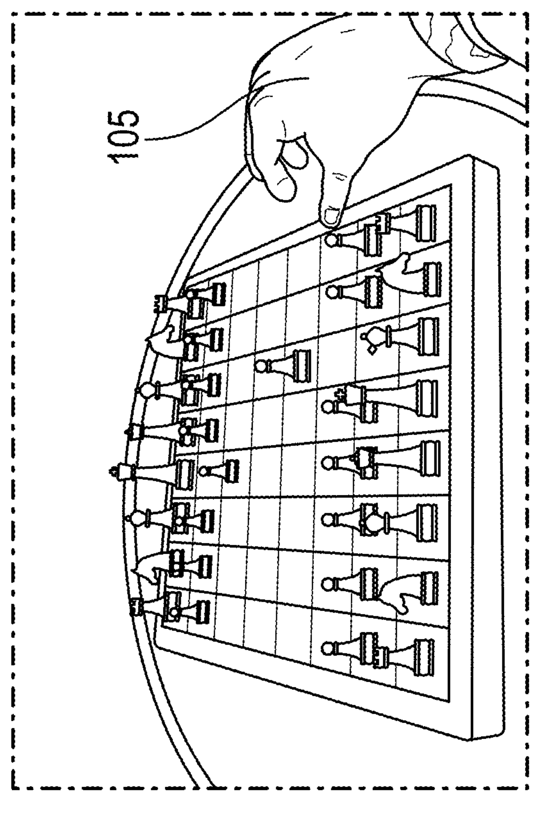
Figure 3E:

FIGS. 3A-3F illustrate exemplary frames of a passthrough video captured in a low-light environment. The capturing and rendering of a physical object 105, shown in this example as a user's hand, may be inconsistent from frame to frame. The physical object, or portions thereof, may blend, as shown in FIG. 3C, into the background, in this case the virtual chessboard, or the physical object or portions thereof may disappear, as shown in FIG. 3D, or overlap with virtual objects. It may be difficult to discern where the physical object starts and stops, as shown in FIGS. 3E and 3F. When the physical object is moving away from the cameras of the XR device 101, as illustrated in FIGS. 2C and 2D, the rendering may include artifacts. Also, the rendering may be inconsistent at varying distances from the cameras. In FIG. 3F, the hand portion appears blended into the virtual chessboard and the floor and the rendering exhibits ambiguity across those objects.

The issue of such artifacts or inconsistency in rendering of physical object 105 is exacerbated when physical object 105 is an object other than the user's arm because, unlike the user's own arm, the user has no sense of the position of another user's hand or arm, or the position of another external physical object. In the case of gameplay with a remote participant or other collaborative activity, the confusing positioning of another user's arm, or another external physical object, particularly if the other user's arm or the other external physical object is in motion, may pose significant challenges in an immersive, interactive experience. For instance, missing the correct rendering and perception of such arms or other physical objects may lead to missing important aspects of the immersive experience, delay in responding to the action, and frustration with the technology. It may even be dangerous in the case of rapid or vigorous movement or arms or legs.

Device light sources, such as flashlights (or torchlights), are common on smartphones, and they commonly provide 40-50 lumens. A light source 113 of the HMD may provide a diffused beam and may illuminate small areas close by.

Figure 5:
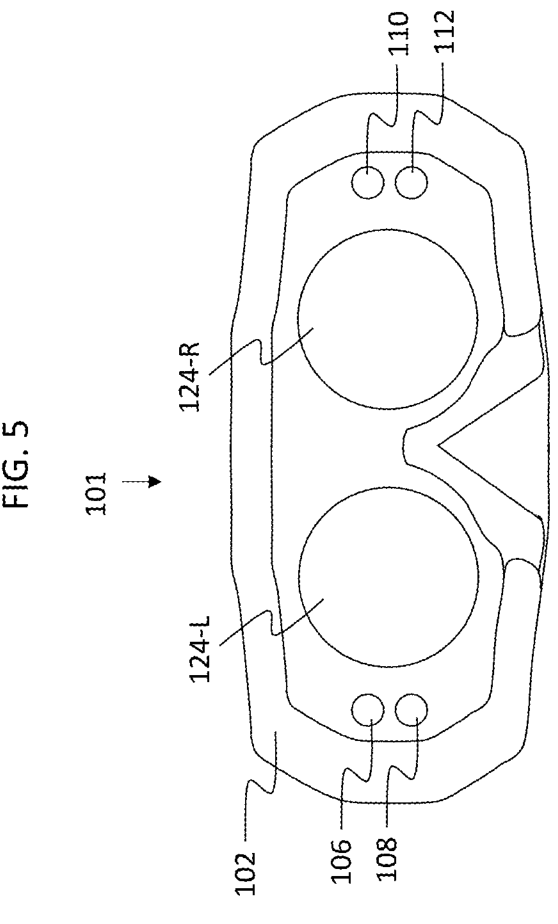
FIGS. 4 and 5 are exemplary schematic illustrations of an example of an XR device, shown as a head mounted display (HMD)
Figure 4:
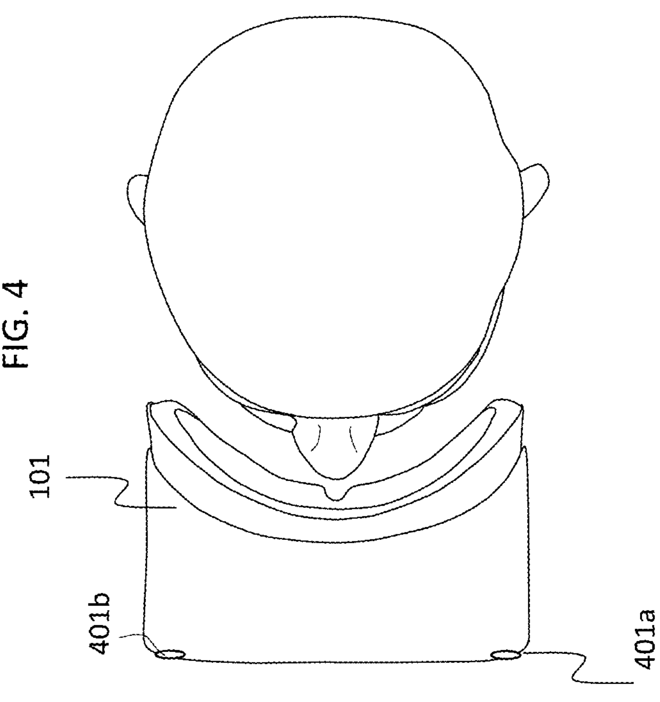

FIGS. 4 and 5 illustrate an example of an XR device 101, shown as a head mounted display (HMD). The HMD may include an external cameras 401*a*, 401*b*. Head mounted display 102 may include displays 124-L (left) and 124-R (right) to create a stereoscopic image by displaying a pair of distinct 2D images (e.g., images of the same scene from slightly different perspectives), which the user may perceive as three-dimensional. A binocular HMD is illustrated, however the technological improvements described herein are also applicable to monocular HMDs, as well as to optical head-mounted displays (OHMDs), which display images and information to users but also allow users to see through them, sometimes referred to as having optical see-through (OST) functionality. The XR device 101 may have video see-through (VST) functionality as well as passthrough technology—images or videos captured via a camera of the XR device 101 that is directed to the environment external to the XR device 101 are displayed via the displays 104-L and 104-R. While described as a head mounted display, a helmet mounted display or other such displays and equipment, as well as AR smart glasses, are also intended. Display 104-L and 104-R may be one or more of a liquid crystal display (LCD), amorphous silicon display, low temperature poly silicon display, electronic ink display, electrophoretic display, active matrix display, electro-wetting display, electro-fluidic display, light-emitting diode display, electroluminescent display, plasma display panel, high-performance addressing display, thin-film transistor display, organic light-emitting diode (OLED) display, or any other suitable equipment for displaying visual images. One or more speakers (not illustrated) may also be provided as integrated with other elements or may be stand-alone units. Display 104-L and 104-R may be used to display visual content while audio content may be played through speakers. A user input interface may also be integrated with or combined with or be in wireless communication with display 104-L and 104-R. Also shown in FIG. 5 are pairs of cameras 106, 108 and 110, 112 positioned on either side of the displays 104-L and 104 R. While specific locations are illustrated it will be understood that these and additional structures and components of the XR device 101 may be positioned elsewhere in, on or near the XR device 101. One or more cameras may be positioned on a front of the XR device 101, for example, near the bottom or near the top at the front portion of an HMD. The light level may be determined based on the image data captured by the one or more cameras. In addition, or instead, light sensors may be positioned on the XR device 101, or an insufficient ambient light level may be determined by light sensor data collected at other parts of a physical space.

Figure 6:
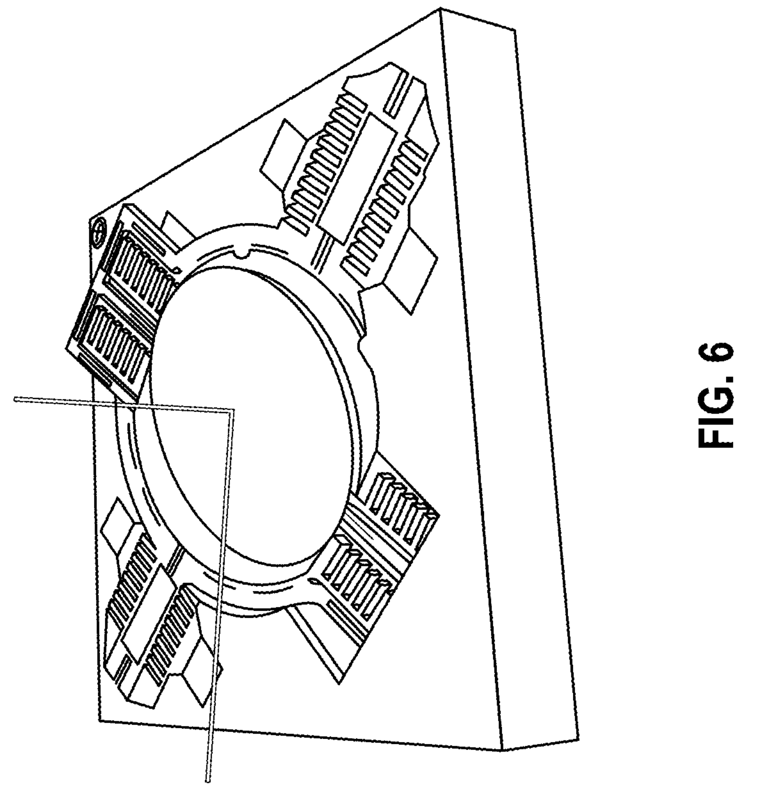
FIG. 6 illustrates an example of a micro-electro-mechanical system (MEMS) mirror that may be used to control an angle of a light cone directed at a physical object.

FIG. 6 illustrates an example of a micro-electro-mechanical system (MEMS) mirror that may be used to control a light cone on the physical object. A MEMS mirror uses microfabricated mechanical structures to control the reflection and direction of light. A MEMS mirror may have its own microprocessor for controlling the position of the mirror. A MEMS mirror works by rapidly tilting in one or two axes (1D or 2D movement) to steer a light beam shined by the light source 113. MEMS mirrors may be moved vary fast so that the light cone 111 may be directed exactly where needed, and may achieve a response time shorter than 1/1000 of a second. Thus, a MEMS mirror may be controlled to reflect light multiple times, at multiple different angles, in the time the camera captures a single video frame. One or more such MEMS-based illumination mirrors may be used to maximize the energy efficiency and to minimize the light illuminating unwanted or unnecessary parts of physical object 105. For example, one MEMS mirror may be deployed for each light source 113 on an HMD to dynamically control the direction of the light source during the video capturing.

Figure 7:
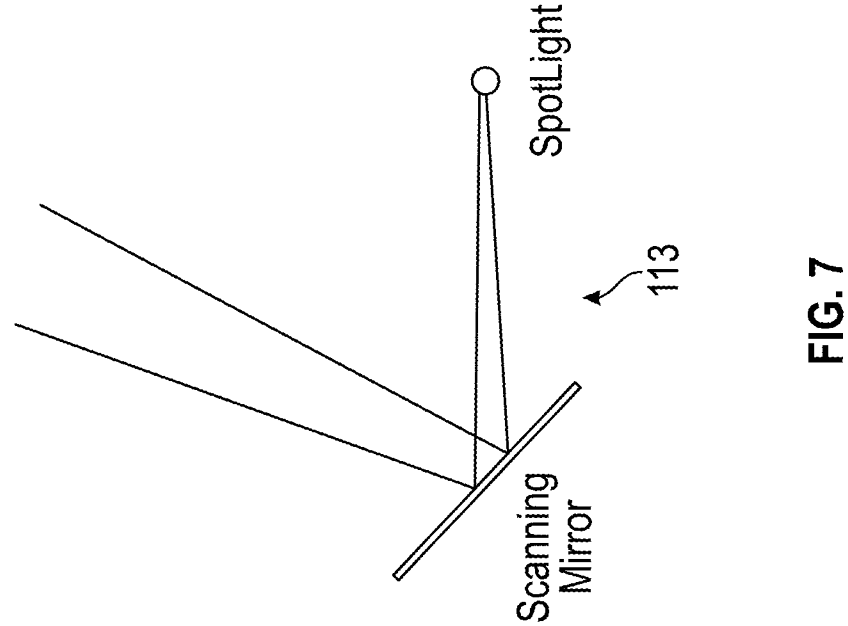
FIG. 7 illustrates a beam of light emitted from a light source as it is reflected off a mirror.

FIG. 7 illustrates an example of a light source 113 that is controlled to illuminate physical object 105. Lens (now shown) and reflectors may facilitate the generation of a focused beam and thus the spotlight, for example, one or more LEDs, may be simplified to provide a small light cone as shown. The beam may then be reflected by the illumination mirror, which may be a MEMS mirror, to illuminate the physical object or a portion of the physical object. Such a light source 113 may be integrated with an XR device 101 or may be provided separately. More than one such light source 113 may be provided on an XR device 101.

Figure 8:
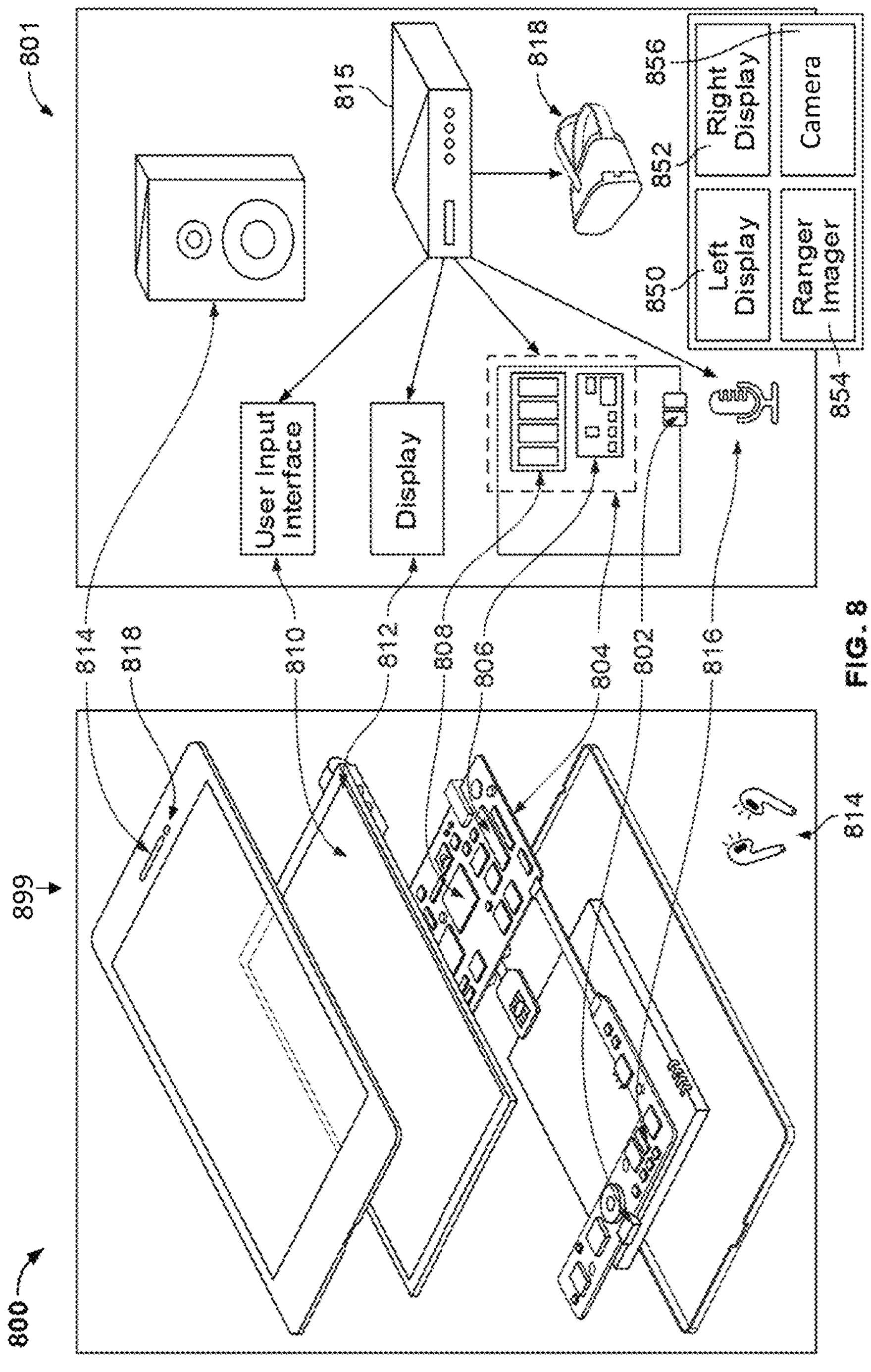
FIG. 8 illustrates an example of a computer system for implementing methods described herein, according to an aspect of the disclosure.

FIG. 8 illustrates an example of an implementation of an XR device 101, including some components thereof. A circuit board may include control circuitry, processing circuitry, and storage (e.g., RAM, ROM, hard disk, removable disk, etc.). In some embodiments, the circuit board may include an input/output path for communicating with the XR HMD controller 916 provided as a remote device. Each device 800/801 may receive content and data via input/output (I/O) path 812 that may comprise I/O circuitry (e.g., network card, or wireless transceiver). I/O path 812 may communicate over a local area network (LAN) or wide area network (WAN), for example, via Wi-Fi, Bluetooth, cellular or other wireless or wired connection.

Control circuitry 818 may comprise processing circuitry 820 and storage 822 and may comprise I/O circuitry. Control circuitry 818 may be used to send and receive commands, requests, and other suitable data using I/O path, which may comprise I/O circuitry. I/O path may connect control circuitry 818 (and specifically processing circuitry) to one or more communications paths (described below). I/O functions may be provided by one or more of these communications paths but are sometimes shown as a single path to avoid overcomplicating the drawing.

Control circuitry 818 may be based on any suitable control circuitry such as processing circuitry 820. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i9 processors) or multiple different processors (e.g., an Intel Core i9 processor and an Intel Core i7 processor). In some embodiments, control circuitry 818 executes instructions for various applications, including the XR application, stored in memory (e.g., storage 822). Specifically, control circuitry 818 may be instructed by the XR application to perform the functions discussed above and below. In some implementations, processing or actions performed by control circuitry may be based on instructions received from the XR application and/or the application for controlling the light source.

In some client/server-based embodiments, control circuitry 818 may include communications circuitry suitable for communicating with other networks. The XR application may be implemented as software or as a set of executable instructions. The instructions for performing any of the embodiments discussed herein may be encoded on non-transitory computer-readable media (e.g., a hard drive, random-access memory on a DRAM integrated circuit, read-only memory etc.). For example, the instructions may be stored in storage 818, and executed by control circuitry 818 of a device 818.

In some embodiments, the XR HMD controller may be a client residing on device 808 (e.g., device 818 or 800), and a server application resides on the physical device. Control circuitry 818 may include communications circuitry suitable for communicating with a server, XR equipment controller and devices, a table or database server, or other networks or servers. Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 822 that is part of control circuitry 818. As referred to herein, the phrase "electronic storage device" or "storage device" should be understood to mean any device for storing electronic data, computer software, or firmware, such as random-access memory, read-only memory, hard drives, optical drives, digital video recorders, solid state devices, quantum storage devices, gaming consoles, or any other suitable fixed or removable storage devices, and/or any combination of the same. Storage 822 may be used to store various types of content described herein. Nonvolatile memory may also be used (e.g., to launch a boot-up routine and other instructions).

Control circuitry 818 may include video generating circuitry and tuning circuitry. Control circuitry 818 may also include scaler circuitry for upconverting and down converting content into the preferred output format of equipment 800. Control circuitry 818 may also include digital-to-analog converter circuitry and analog-to-digital converter circuitry for converting between digital and analog signals. In some embodiments all elements of system 800 may be inside housing of the XR display device 818. In some embodiments, XR HMD display device 818 comprises a camera 856 (or a camera array or LiDAR-Light Detection and Ranging). Video cameras may be integrated with the equipment or externally connected. One or more of cameras may be a digital camera comprising a charge-coupled device (CCD) and/or a complementary metal-oxide semiconductor (CMOS) image sensor. In some embodiments, one or more of cameras 856 may be dirtied at outside physical environment (e.g., two cameras may be pointed out to capture to parallax views of the physical environment). In some embodiments, XR device 101 may comprise one or more biometric sensor or sensors to measure eye rotation (e.g., electrodes to measure eye muscle contractions) and head movement. HMD 818 may also comprise range image 854 (e.g., LASER or LIDAR) for computing distance of physical objects by bouncing the light of the objects and measuring delay in return (e.g., using cameras 856). In some embodiments, HMD 818 comprises left display 850, right display 850 (or both) for generating VST images.

The XR HMD controller may be implemented using any suitable architecture. For example, it may be a stand-alone application wholly implemented on each one of user equipment device 800 and user equipment device 801. In such an approach, instructions of the application may be stored locally (e.g., in storage 808), and data for use by the application is downloaded on a periodic basis (e.g., from the edge service network, from an out-of-band feed, from an Internet resource, or using another suitable approach). Control circuitry 818 may retrieve instructions of the application from storage 808 and process the instructions to provide XR generation functionality and perform any of the actions discussed herein. Based on the processed instructions, control circuitry 818 may determine what action to perform when input is received from user input interface 810. For example, head movement or movement of a hand or handheld device via user input interface 810. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the XR application may be downloaded and interpreted or otherwise run by an interpreter or virtual machine (run by control circuitry 818). In some embodiments, the XR application may be encoded in the ETV Binary Interchange Format (EBIF), received by control circuitry 818 as part of a suitable feed, and interpreted by a user agent running on control circuitry 818. For example, the XR application may be an EBIF application. In some embodiments, the XR application may be defined by a series of JAVA-based files that are received and run by a local virtual machine or other suitable middleware executed by control circuitry 818.

Figure 9:
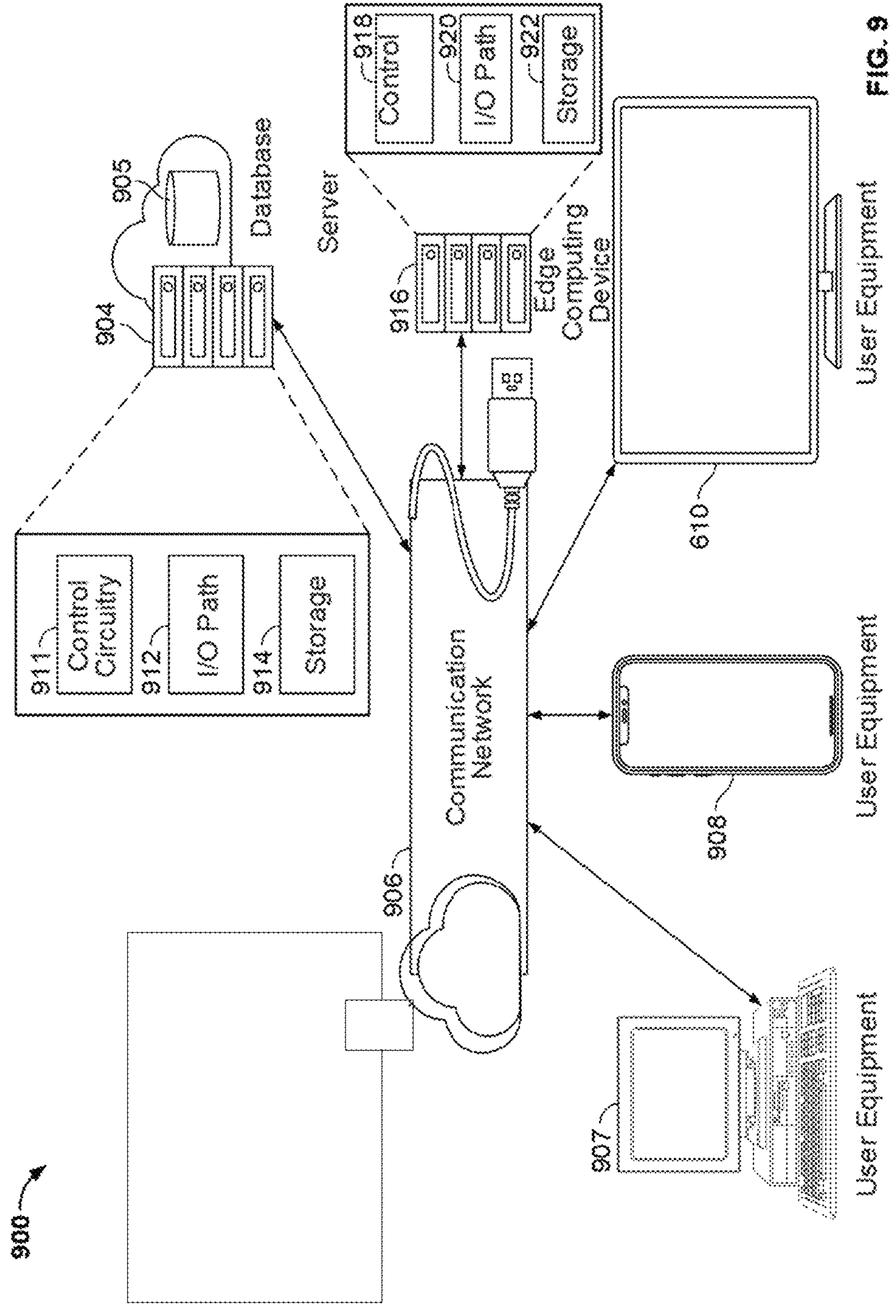
FIG. 9 illustrates a server connected to a database communicating with other nodes via a network, according to an aspect of the disclosure.

FIG. 9 is a diagram of an illustrative system 900 for lighting control, in accordance with some embodiments of this disclosure. User equipment devices 907, 908, 910 (e.g., which may correspond to one or more of computing device) may be coupled to communication network 906. Communication network 906 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 906) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not always drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may communicate with each other directly through an indirect path via communication network 906.

System 900 may comprise one or more servers 904, and one or more edge computing devices 916 (e.g., included as part of an edge computing system). In some embodiments, the XR application may be executed at one or more of control circuitry 911 of server 904 (and/or control circuitry of user equipment devices 907, 908, 910 and/or control circuitry 918 of edge computing device 916).

In some embodiments, server 904 may include control circuitry 911 and storage 914 (e.g., RAM, ROM, Hard Disk, Removable Disk, etc.). Storage 914 may store one or more databases. Server 904 may include an input/output path 912. I/O path 912 may provide AR generation data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Edge computing device 916 may comprise control circuitry 918, I/O path 920 and storage 922, which may be implemented in a similar manner as control circuitry 911, I/O path 912 and storage 924, respectively of server 904. Edge computing device 916 may be configured to be in communication with one or more of user equipment devices 907, 908, 910 and video server 904 over communication network 906, and may be configured to perform processing tasks (e.g., AR generation) in connection with ongoing processing of video data. In some embodiments, a plurality of edge computing devices 916 may be strategically located at various geographic locations, and may be mobile edge computing devices configured to provide processing support for mobile devices at various geographical regions.

Figure 10:
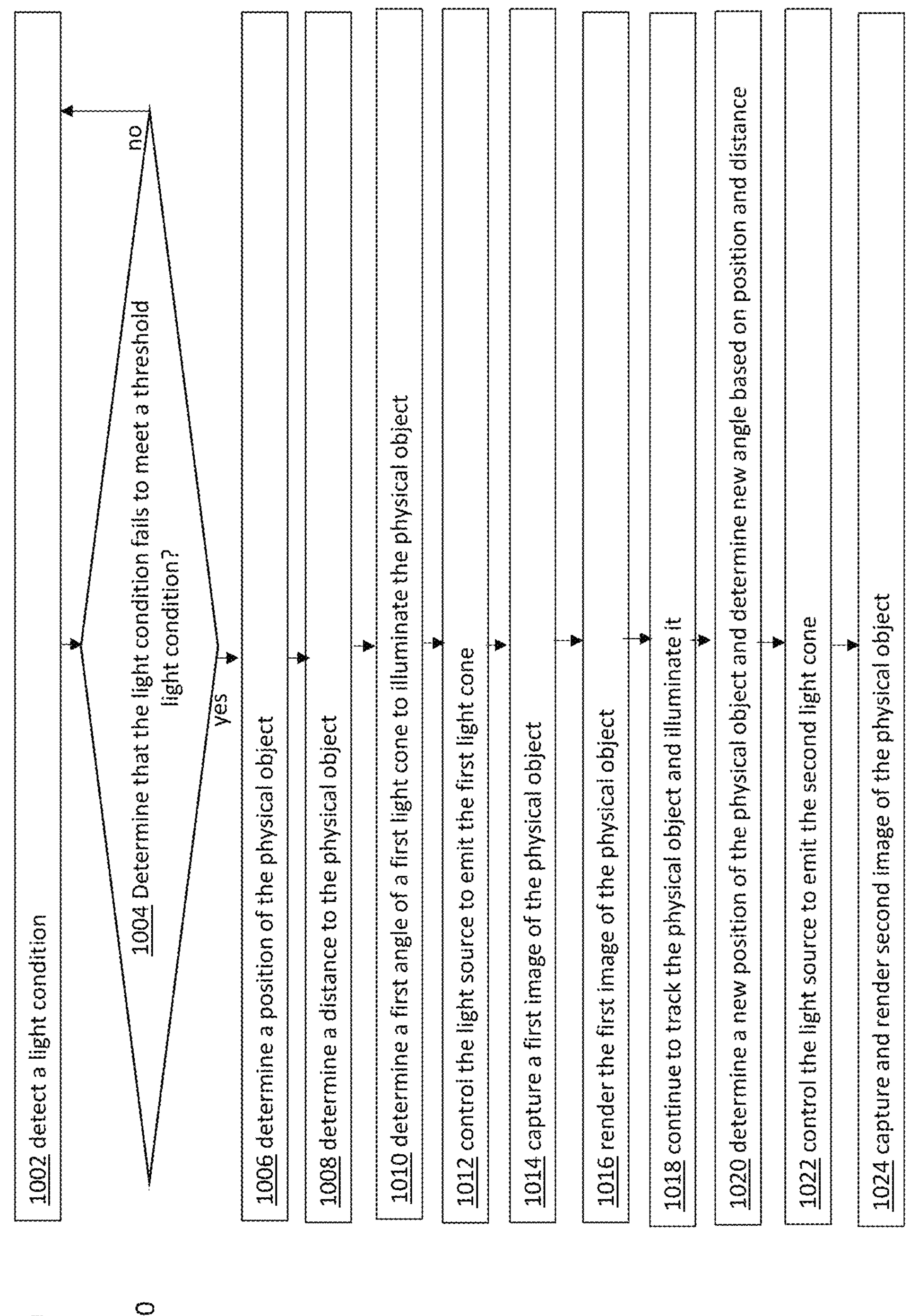
FIG. 10 illustrates an example of a process for controlling a light cone, according to an aspect of the disclosure.

FIG. 10 is a flowchart showing operations of a process 1000 according to an aspect of the disclosure. The methods or processes 1000 may be implemented, in whole or in part, by the system(s) described herein and shown in the figures. One or more actions of the depicted processes may be incorporated into or combined with one or more actions of any other process or embodiments described herein. The processes may be saved to a memory or storage (such as any one or more of those shown in FIGS. 8-9) as one or more instructions or routines that may be executed by a corresponding device or system to implement the process. Depending on the embodiment, one or more steps of the described process may be implemented or facilitated by a server. While some of the description corresponding to the processes 1000 reference HMDs, it will be appreciated that the described steps may be implemented with respect to any suitable wearable or other XR device in some embodiments.

At 1002, the system may detect a light condition in the physical space 109. The light condition may be determined based on image data captured by the camera or using an external light sensor.

At 1004, the light condition may be compared with a threshold light condition. If the light condition is adequate, the system may continue monitoring for light conditions as it moves through 3D space or for light conditions for other objects.

If the light condition is inadequate, processing continues to 1006, where the position of the physical object may be determined. For example, LiDAR scanning may be used to determine this. In an embodiment, LiDAR scanning for the physical object 105 and illumination may be triggered by a wearer of the XR device 101 signaling a poor rendering of the physical object 105, or by a rendering the user deems insufficient for his/her needs. For example, the user may judge the ambient lighting insufficient given the condition of user's eyesight, the nature of the activity the user is engaging in, the type of physical object 105, the color/shininess of the physical object 105, the exposure of the physical object 105 to light emitted by an external light source, such as a ceiling light or room lamp, the precision with which the user is interacting with the physical object 105, and the like.

At 1008, a distance to the physical object may be determined. For example, LiDAR scanning may be used to determine this, or camera depth sensing processing may be used, for example, using two cameras with a known distance between them.

At 1010, a first angle is determined for a first light cone so that a portion of the physical object in a line of sight of the light source 113 may be illuminated.

At 1012, the light source may be controlled to emit light at the determined angle. In an embodiment, this angle is changed several times to illuminate an entire portion of the portion of the physical object within the line of sight of the light source 113. An illumination path may be traced on the portion of the physical object within the line of sight of the light source 113, which may entail changing the angle of the light cone 111 numerous times before the entire portion of the physical object within the line of sight of the light source 113 has been illuminated. This light path may be started and completed while the camera(s) capture(s) a single frame. A MEMS mirror may be coupled to the light emitter of the light source to provide rapid reflection of the light targeting the portion of the light source. In an embodiment, the system may continue to monitor an ambient light condition in the physical space 109 and respond to a change by turning off/on or changing the amount of illumination provided by the light source 113. For example, in response to determining an increase in ambient lighting, the system may determine that a threshold light level has been reached and discontinue illumination by the light source 113.

At 1014, a first image of the physical object may be captured. In an embodiment, a single frame of the video captured by a camera may capture an entire portion of the physical object that is in the line of sight of the light source. The light cone may illuminate at once the entire portion of the physical object that is in the line of sight of the light source, or the light cone may traverse the entire portion of the physical object that is in the line of sight of the light source according to a illumination route. In an embodiment, the system may track the position of the physical object 105 to continue to control the light source 113 to illuminate the portion of the physical object within the line of sight of the light source 113. The physical object 105 may move, rotate or otherwise change orientation in 3D physical space 109 to reveal a different portion of the physical object to the light source 113. The XR device and the camera(s) and light source(s) thereon may also move or change orientation. Thus, the angle of the illumination provided by the light source 113 may be changed continuously in real time. In an embodiment, video tracking may be used to determine at any given time the position of the portion of the physical object within the line of sight of the light source 113. If an illumination path is selected for the light cone 111 (e.g. instead of the light cone illuminating in one instant the entirety of the portion of the physical object exposed to the light source), then the radius and angle of the light cone 111 may be adjusted in the middle of the traversal of the illumination path. For example, one area of the portion of the physical object being traversed may be wider than other areas, and so the radius of the light cone may be increased for the wider area and then decreased after traversing the wider area as the light cone 111 continues along the illumination path.

At 1016, the captured image is rendered by a display, such as left and right eye stereoscopic displays (if two cameras are used), of the XR device. Also contemplated is rendering the scene, including the physical object 105, to a remote user. For example, a remote user may use another XR device, for example, a handheld device, to view and to interact with the virtual objects and the physical object 105.

At 1018, the physical object 105 is tracked by the system to continue illumination in this way, with continued adjustment of the light source taking into account the position of the portion of the physical object in the line of sight of the light source.

The position and size of the portion of the physical object in the line of sight of the light source, as well as its orientation and distance to the light source may change as the physical object moves through space. The size may change because, as the object rotates or otherwise changes orientation in space, the portion of the physical object revealed to the light source 113 may change. At 1020, the new position of the physical object 105 is determined and, based on the position data, a new illumination angle may be calculated—the light cone 111 may have to be adjusted according to the new position of the physical object 105 relative to the XR device 101. In an embodiment, head orientation and gaze of the user may determine the relevant scene for the camera. The physical object may move off scene and a new physical object may move on scene depending on user head orientation and user gaze. Light conditions and additional lighting may be relevant only for physical objects determined to be with the relevant scene.

At 1022, the light source is controlled to emit the light cone 111 based on the new position. The size (e.g. radius) of the light cone 111 may have to be adjusted based on the size of the portion of the physical device to which the light source 113 now has a direct line of sight.

At 1024, a second image may be captured and rendered. In an embodiment, the frames may be rendered on the display according to a standard frame rate (refresh rate) regardless of the speed with which the images are captured.

Figure 11B:
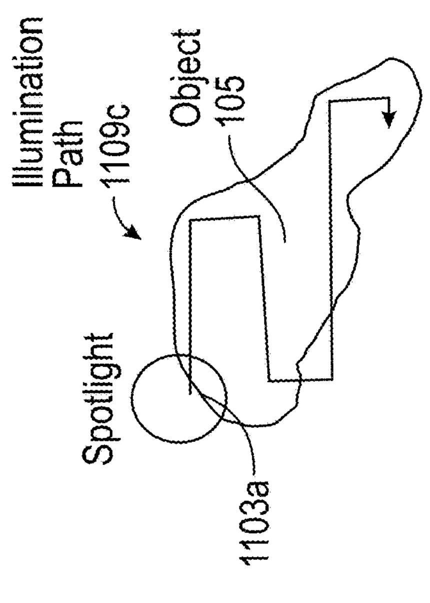
Figure 11B:
Figure 11B:
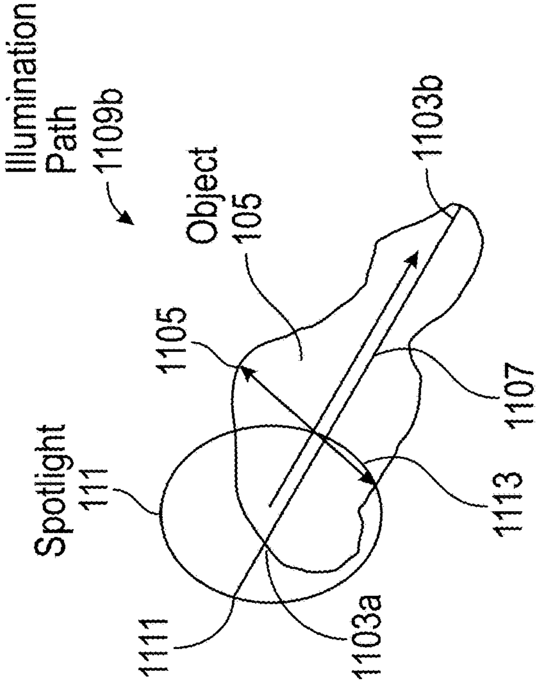
Figure 11A:
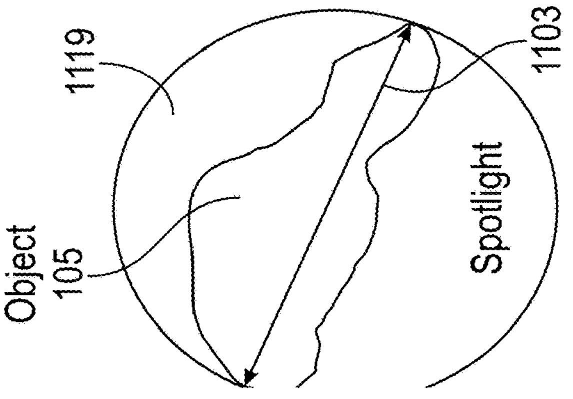

FIGS. 11A-11C illustrate examples of illumination approaches for illumination a physical object 105 by the light source 113. Illumination may be planned depending on the size and shape of the object, its distance from the light source 113, and the size of the section of the light cone 111 that will be incident on it.

As shown in FIG. 11A, the longest dimension 1103 of the portion of physical object 105 that is within the line of sight of the light source 113 may be estimated and the section 1119 of the light cone 111 may be sized by the light source 113 to illuminate the entire physical object at once. For example, (e.g. mirrors within) the light source 113 may be controlled to direct the light cone 111 such that a center of the section 1119 of the light cone 111 will be incident on a center point of physical object 105. In this way, as shown in FIG. 11A, the entire physical object 105 may be illuminated at once. One or more liquid lenses or MEMS-based reflectors, or a combination of the foregoing, may be used to control in real time the cone size so that the light cone 111 covers an entire object of interest 105. This approach may reduce the need for changing the angle of illumination provided by the light source 113.

As physical object 105 and/or the XR device 101 move with respect to each other in the physical space in the course of physical activity, the size of the light cone 111, and the illumination approach may be changed. The system may continuously track the size and position of the physical object to which the camera(s) and the light source 113 have a line of sight. For example, a different side of physical object 105 may be revealed to the light source 113 in the course of movement of physical object 105 and the XR device 101. This second side may be larger or smaller than the previous one, which may require changing the size of the light cone 111 for illuminating physical object 105. Thus, more than one of the illumination approaches shown in FIGS. 11A-11C may be used for the same physical object 105 in consecutive frames.

FIG. 11B illustrates another example of a illumination approach. In this approach, the light cone 111 traverses a side of physical object 105 along its longest dimension 1103. The illumination proceeds along a illumination route 1109*b* that may begin at one end of a virtual line 1107 that connects distal points 1103*a*, 1103*b* of the longitudinal dimension 1103 of physical object 105. The size of the section 1119 of the light cone 11 may controlled by the light source 113 so that, given the determined distance from the portion of physical object 105, the section 1119 of the light cone 111 encompasses the entire width 1113 of physical object 105 in the line of sight of the light source 113.

In an implementation, the light cone 111 may be positioned initially so that its perimeter 1111 of the section 1119 of the light cone 111 aligns with, or falls just beyond, the endpoint 1103*a* of physical object 105, and then the light cone 111 would be moved along the illumination route 1109*b*. In this way, the system may minimize the portion of light cone 111 that would be wasted because it would not fall on physical object 105.

In an embodiment, the speed with which the light cone 111 traverses the illumination route on physical object 105 may be calculated so that the illumination of the entire physical object 105 is completed within a single frame. In this way, the physical object may be equally illuminated for each frame of video. In an embodiment, the very rapid control of the angle of the light provided by MEMS mirrors may enable directing the light cone 113 very rapidly along the entire illumination route on physical object 105. In this way, all sides of the physical object 105 within line of sight of the light source 113 may be receive sufficient light during a single frame capture, even if the light cone 111 does not encompass the entire physical object 105 at any given point in time.

The size of the light cone 111 and the illumination route may be co-optimized to minimize the illumination route and thus increase energy efficiency. For example, a weighted cost function may be used, where the wasted energy is one term and the illumination route simplicity is another term. By way of example, such a cost function may be:

$$J(i) = w1 * E1(i) + w2 * E2(i) + w3 * E3(i)$$

where:

i=1, 2, 3, is corresponding to the illumination processes shown, respectively, in FIGS. 11A, 11B and 11C;

E1 is the energy for the illumination light, E1(1) has the highest energy, while E1(3) has the least energy cost;

E2 is the computation energy for the planning of the illumination path, E2(1) has the least energy cost, while E2(3) has the highest energy cost;

E3 is the energy for controlling the light during capturing, E3(1) has the least energy cost, while E3(3) has the most energy cost;

E1, E2, and E3 may be calculated based on the specific choice of hardware and algorithms, and may be measured and calibrated in the implementation.

W1, w2, w3 may each be set to ⅓, but may be tuned differently depending on design considerations.

FIG. 11C illustrates another illumination path 1109*c* that may be used to illuminate a side or portion of physical object 105 that is larger than the conic section of the light cone 111 that is incident on it. For example, it may be desirable to minimize the size of the light cone 111 to avoid too much light intruding on the visual feed of the HMD wearers, and thus a narrower light cone 111 may be desirable. A illumination route 1109*c* may start at an end 1103*a* of the longest dimension 1103 of physical object 105 and move back and forth perpendicular or transverse to a virtual line that connects the most points most distant from each other in the longest dimension 1103. Other such illumination routes are contemplated. An object of such illumination routes is to minimize the time it takes to illuminate the entire physical object 105.

In an embodiment, a size of the light cone 111 may be varied in a single traversal of physical object 105. For example, a human arm may have wider and thinner portions and thus the light cone 111 may at times be narrowed to avoid excessive illumination—e.g., illumination of objects beyond and/or other than physical object 105 of interest. Similarly, physical object 105 may move in relation to the light source 113 to expose sides of varying size to the light cone. For this reason, the size of the light cone 111 and the illumination route of the light cone 111 may be changed midcourse for various sides of the same physical object 105—even before completion of an illumination route.

Figure 12:
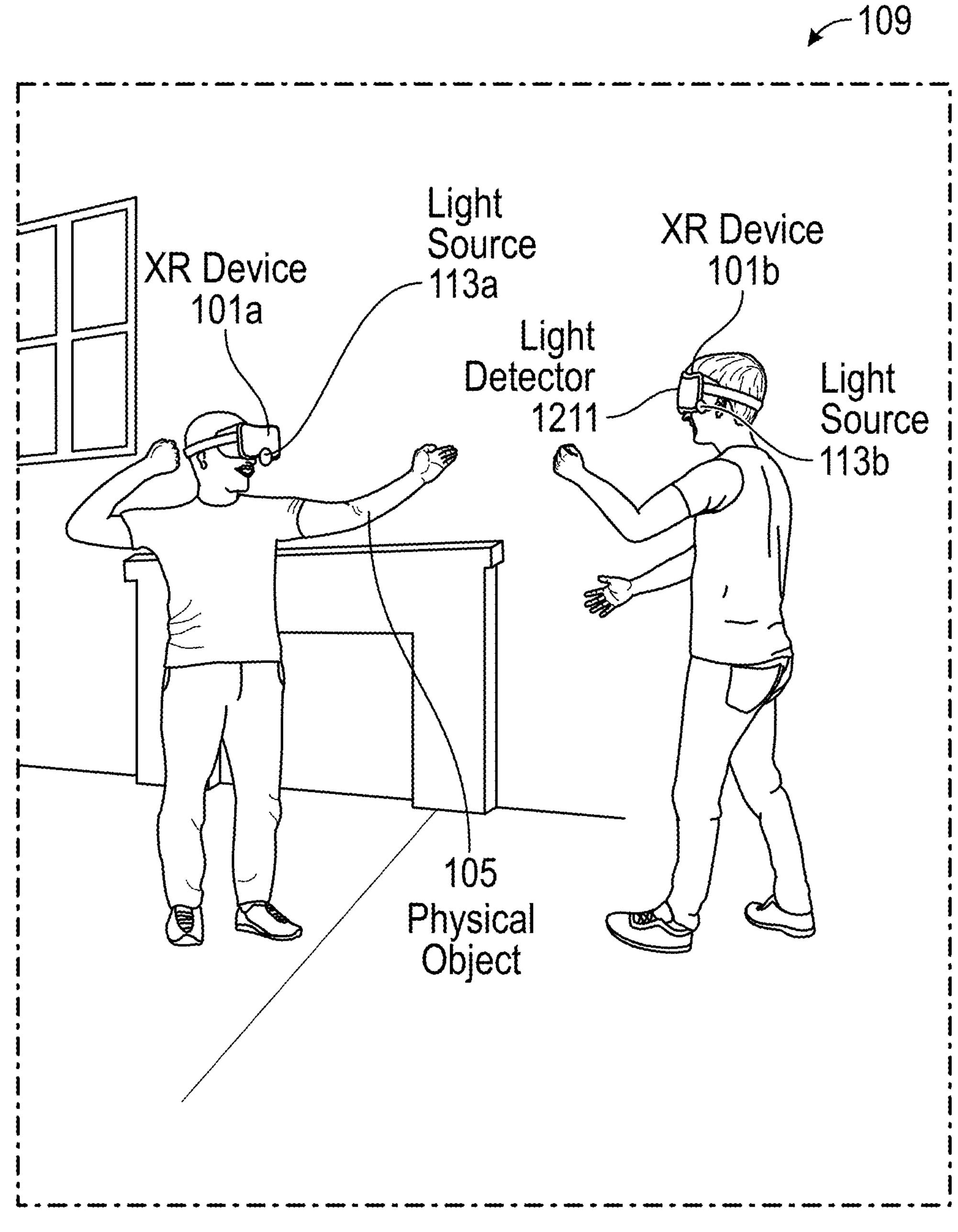
FIG. 12 illustrates an example of a process for controlling a light cone based on triggering input from a second device, according to an aspect of the disclosure.

FIG. 12 illustrates an embodiment in which a first user wearing XR device 101*a* is engaged in a game or other interactive augmented reality activity with a second user wearing XR device 101*b*. A camera or other light detector 1211 of the XR device 101*b* of the second user detects insufficient light illuminating a physical object 105, which in this case is the arm or hand of another user. XR device 101*b* may determine a light condition below a threshold level needed for proper rendering by the XR device 101*b* and in response may automatically request to XR device 101*a* to activate light source 113*a*.

In an embodiment, the XR device 101*b* may determine that physical object 105 may be closer to XR device 101*a*, or the XR device 101*b* may determine that the light source 113*a* of XR device 101*a* may have a more direct or less obstructed line of sight to physical object 105, than would the light source of XR device 101*b*. Proximity of each of the XR devices 101*a*, 101*b* may be estimated using a variety of techniques, including simultaneous localization and mapping (SLAM), GPS data, satellite data, wireless network and/or Wi-Fi signal strength detection, acoustic signals, and the like for determining location. In an embodiment, the location of physical object 105 may be extrapolated based on the location of a nearby object with a known location. In addition, the insufficiently illuminated physical object 105 is located between two objects XR device 101*a* and XR device 101*b* whose locations are known, and thus may locate the insufficiently illuminated physical object 105 with more accuracy. Accordingly, the XR device 101*b* may determine that the XR device 101*a* is better positioned to illuminate physical object 105 than the XR device 101*b*. Or, the XR device 101*b* may determine that the light source 113*a* of XR device 101*a* is better in some way than the light source 113*b* of XR device 101*b*—for example, it may be determined that the light source 113*a* of XR device 101*a* is equipped with a MEMS mirror or is otherwise capable of tracking physical object 105 as physical object 105 and the XR device 101*a* move rapidly in the course of an active XR game than would the light source of XR device 101*b*. One or more such determinations may be made by the XR device 101*a*, by a system, such as an edge computing device located remotely, or jointly by the XR device 101*b* together with the XR device 101*a* and/or the edge computing device.

Such a request to XR device 101*a* may indicate the specific physical object 105, or a specific portion of physical object 105, that needs additional illumination. Such a request may indicate a light level detected for the specific physical object 105, or a specific portion of physical object 105, to enable the light source 113 of XR device 101 to provide the proper amount of light (that is, light within a range of lumens). Or a wearer of the XR device 101*b* may request the XR device 101*a* for additional illumination of a specific physical object 105 so that the display(s) inside XR device 101*b* may render physical object 105 more clearly, consistently and accurately.

In an embodiment, it may be determined that both the light source 113*a* and the light source 113*b* will illuminate physical object 105. For example, a first side of physical object 105—within a line of sight of light source 113*a*—may be illuminated by the light source 113*a* while a second side of physical object 105—within a line of sight of light source 113*b*—may be illuminated by the light source 113*b*. In addition, or instead, the system may alternate illumination by the light source 113*a* and by the light source 113*b* in the course of a joint activity, depending on which light source 113, 113*b* is closer to and/or has a more direct line of sight to physical object 105. The selection of the light source may be based on which light source 113*a*, 113*b* can provide an angle of incidence closer to 90 degrees to a major surface of physical object 105, and/or depending on which light source 113, 113*b* has a line of sight to physical object 105 less obstructed other objects.

A remote participant may be in a location with light conditions different from the physical space 109 in which XR device 101 is located, or may have cameras and/or displays at different settings from those of the XR devices present. In an embodiment, such a request may be automatically transmitted to the XR device 101 and/or to system that controls the XR device 101. Any observed inconsistency, artifact, blending, or the like as shown in FIGS. 2-3 experienced in the rendering provided to a remote participant may trigger an automatic request, or a manual request by a remote user, to one or more users of the XR device 101*a*, 101*b*, and/or to the corresponding XR device 101*a*, 101*b*, and/or to system that controls the XR device 101*a*, 101*b* to activate the light source 113*a*, 113*b*. The request may identify the light condition in the rendered image and/or the amount of illumination required. The request may identify the physical object for which additional illumination is requested.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto.

What is claimed is:

1. A method comprising:

detecting, via a sensor of an XR device, a first position of a physical object relative to the XR device, wherein the physical object is experiencing a lighting condition below a threshold lighting condition;

determining a first angle for directing a first light cone to illuminate, by a light source, a portion of the physical object, wherein the first angle is determined according to the first position of the physical object relative to the XR device;

emitting from the light source the first light cone at the determined first angle;

capturing, by a camera of the XR device, a first image of the portion of the physical object illuminated by the first light cone;

detecting, via the sensor of the XR device, a second position of the physical object relative to the XR device;

determining a second angle for directing a second light cone to illuminate, by the light source, the portion of the physical object, wherein the second angle is determined according to the second position of the physical object relative to the XR device;

emitting from the light source the second light cone at the determined second angle;

capturing, by the camera of the XR device, a second image of the portion of the physical object illuminated by the second light cone; and rendering, for display on the XR device using a pass-through mode, the first image of the portion of the physical object and the second image of the portion of the physical object.

2. The method of claim 1, further comprising:

segmenting image data of the portion of the physical object, wherein the rendering of the first image of the portion of the physical object comprises displaying the first image and the second image over a virtual background displayed by the display of the XR device.

3. The method of claim 1, wherein the determining the first angle for directing the first light cone comprises adjusting a micro-electro-mechanical system (MEMS) mirror so as to reflect the first light cone to illuminate the portion of the physical object in a line of sight of the light source.

4. The method of claim 1, further comprising:

determining a first dimension of the portion of the physical object; and selecting a size of the first light cone to illuminate in one instant an entirety of the first dimension.

5. The method of claim 1, wherein the XR device is a head-mounted display (HMD) and the light source comprises an LED mounted on the HMD.

6. The method of claim 1, further comprising:

determining a minimum size of the first light cone sufficient to illuminate an entirety of a dimension of the portion of the physical object; and sizing the first light cone according to the minimum size.

7. The method of claim 1, further comprising:

determining a dimension of the portion of the physical object; and determining an illumination path of the first light cone over the portion of the physical object based on the dimension of the portion of the physical object, wherein the illumination path is determined by minimizing a cost function in which energy spent for the illuminating by the first light cone is a term of the cost function.

8. The method of claim 1, wherein the portion of the physical object is an entire part of the physical object in a line of sight of the camera, and further comprising:

determining a longest dimension of the portion of the physical object; and determining an illumination path of the first light cone over the portion of the physical object such that the first light cone starts the illumination path at one end of a virtual line segment connecting distal points of the longest dimension, wherein the first light cone is sized to encompass a widest region transverse to the longest dimension of the portion of the physical object.

9. The method of claim 1, wherein the determining of the first position of the physical object relative to the XR device is performed using data obtained by a depth sensor mounted on the XR device.

10. The method of claim 1, wherein an entire portion of the physical object in a line of sight of the light source is illuminated at one instant by the light source, and the first image of the entire portion of the physical object in the line of sight of the light source as illuminated by the light source is captured in a single frame of video by the camera.

11. The method of claim 1, further comprising:

selecting an illumination path by the first light cone over the portion of the physical object;

emitting the first light cone at the determined first angle to illuminate a first area of the portion of the physical object;

controlling, according to the selected illumination path, the light source to emit the first light cone at a new second angle, wherein the new angle is distinct from the first angle and at the new angle the first light cone illuminates a second area of the first portion of the physical object; and capturing in a single video frame an entirety of the portion of the physical object, including the first area and the second area, as illuminated by a traversal by the first light cone of the illumination path.

12. The method of claim 1, wherein the determining of the angle for directing the first light cone comprises:

determining a virtual plane perpendicular to a virtual line extending from the light source;

determining a minimum size of a section of the first light cone sufficient to encompass an entire dimension of the portion of the physical object lying on the virtual plane; and generating the first light cone with the minimum size and directed to illuminate the entire dimension of the portion of the physical object lying on the virtual plane.

13. The method of claim 1, wherein a radius of the first light cone is equal to the radius of the second light cone.

14. A system comprising:

a memory; and control circuitry configured:

to detect, via a sensor of an XR device, a first position of a physical object relative to the XR device, wherein the physical object is experiencing a lighting condition below a threshold lighting condition;

to store the first position of the physical object relative to the XR device;

to determine a first angle for directing a first light cone to illuminate, by a light source, a portion of the physical object, wherein the first angle is determined according to the first position of the physical object relative to the XR device;

to emit from the light source the first light cone at the determined first angle;

to capture, by a camera of the XR device, a first image of the portion of the physical object illuminated by the first light cone;

to detect, via the sensor of the XR device, a second position of the physical object relative to the XR device;

to determine a second angle for directing a second light cone to illuminate, by the light source, the portion of the physical object, wherein the second angle is determined according to the second position of the physical object relative to the XR device;

to emit from the light source the second light cone at the determined second angle;

to capture, by the camera of the XR device, a second image of the portion of the physical object illuminated by the second light cone; and to render, for display on the XR device using a pass-through mode, the first image of the portion of the physical object and the second image of the portion of the physical object.

15. The system of claim 14, wherein the system is configured:

to segment image data of the portion of the physical object, wherein the rendering of the first image of the portion of the physical object comprises displaying the first image and the second image over a virtual background displayed by the display of the XR device.

16. The system of claim 14, wherein the determining the first angle for directing the first light cone comprises adjusting an angle of a micro-electro-mechanical system (MEMS) mirror so as to reflect the first light cone to illuminate the portion of the physical object in a line of sight of the light source.

17. The system of claim 14, wherein the system is configured:

to determine a first dimension of the portion of the physical object; and to select a size of the first light cone to illuminate in one instant an entirety of the first dimension.

18. The system of claim 14, wherein the XR device is a head-mounted display (HMD) and the light source comprises an LED mounted on the HMD.

19. The system of claim 14, wherein the system is configured:

to determine a minimum size of the first light cone sufficient to illuminate an entirety of a dimension of the portion of the physical object; and to size the first light cone according to the minimum size.

20. The system of claim 14, wherein the system is configured:

to determine a dimension of the portion of the physical object; and to determine an illumination path of the first light cone over the physical object based on the dimension of the portion of the physical object, wherein the illumination path is determined by minimizing a cost function in which energy spent for the illuminating by the first light cone is a term of the cost function.

* * * * *